United States Patent
Jain et al.

(10) Patent No.: US 11,932,804 B2
(45) Date of Patent: Mar. 19, 2024

(54) COMPOSITIONS AND METHODS FOR WELL CEMENTING

(71) Applicant: Schlumberger Technology Corporation, Sugar Land, TX (US)

(72) Inventors: Bipin Jain, Clamart (FR); Shameed Ashraf, Kuala Lumpur (MY)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 17/643,692

(22) Filed: Dec. 10, 2021

(65) Prior Publication Data

US 2023/0193108 A1    Jun. 22, 2023

(51) Int. Cl.
| | | |
|---|---|---|
| C09K 8/42 | (2006.01) | |
| C04B 28/10 | (2006.01) | |
| C09K 8/467 | (2006.01) | |

(52) U.S. Cl.
CPC .............. C09K 8/424 (2013.01); C04B 28/10 (2013.01); C09K 8/467 (2013.01)

(58) Field of Classification Search
CPC .......... C09K 8/424; C09K 8/467; C04B 28/10
See application file for complete search history.

(56) References Cited

U.S. PATENT DOCUMENTS

| | | | |
|---|---|---|---|
| 5,110,486 A | 5/1992 | Manalastas et al. | |
| 5,373,901 A | 12/1994 | Norman et al. | |
| 6,162,766 A | 12/2000 | Muir et al. | |
| 7,338,923 B2 | 3/2008 | Roddy | |
| 11,130,899 B2 | 9/2021 | Allouche et al. | |
| 2005/0113262 A1* | 5/2005 | Ravi | C09K 8/536 507/125 |
| 2009/0308612 A1 | 12/2009 | Weaver et al. | |
| 2011/0017452 A1 | 1/2011 | Benkley | |
| 2013/0157903 A1 | 6/2013 | Benkley et al. | |
| 2014/0051606 A1 | 2/2014 | Dobson, Jr. | |
| 2014/0166285 A1 | 6/2014 | Santra et al. | |
| 2014/0326446 A1* | 11/2014 | Roddy | E21B 7/20 166/67 |

(Continued)

FOREIGN PATENT DOCUMENTS

| | | |
|---|---|---|
| EP | 2457974 A1 | 5/2012 |
| WO | 2014078069 A1 | 5/2014 |

(Continued)

OTHER PUBLICATIONS

Nelson et al., "Laboratory Testing, Evaluation and Analysis of Well Cements," in Nelson EB and Guillot D (eds.): Well Cementing—2nd Edition, Schlumberger, 2006, pp. 641-643.

Nelson et al., "Special Cement Systems," in Nelson EB and Guillot D (eds.): Well Cementing—2nd Edition, Schlumberger, 2006, pp. 235-237.

(Continued)

*Primary Examiner* — Crystal J. Lee
(74) *Attorney, Agent, or Firm* — Jeffrey D. Frantz (57) ABSTRACT

The effectiveness of expansive cement systems may be diluted when, during a well cementing operation, commingling takes place between the cement slurry and a spacer fluid, a drilling fluid, or both. Incorporating expansive agents in the spacer fluid or drilling fluid may reduce or negate the loss of expansion at the cement slurry/spacer interface or the cement slurry/drilling fluid interface, thereby promoting zonal isolation throughout the cemented interval.

20 Claims, 2 Drawing Sheets

(56) References Cited

U.S. PATENT DOCUMENTS

| | | |
|---|---|---|
| 2016/0355721 A1 | 12/2016 | Cortner et al. |
| 2018/0230358 A1 | 8/2018 | Jain |
| 2018/0305609 A1 | 10/2018 | Hall |
| 2019/0062213 A1 | 2/2019 | Lewis et al. |
| 2019/0161669 A1 | 5/2019 | Droger et al. |
| 2019/0194522 A1 | 6/2019 | Sodhi |
| 2020/0308470 A1 | 10/2020 | Doan et al. |

FOREIGN PATENT DOCUMENTS

| | | | |
|---|---|---|---|
| WO | 2015195596 A1 | 12/2015 | |
| WO | 2017023159 A1 | 2/2017 | |
| WO | WO-2017023159 A1 * | 2/2017 | ......... C04B 24/2611 |
| WO | 2018144355 A1 | 8/2018 | |

OTHER PUBLICATIONS

International Search Report and Written Opinion issued in International Patent application PCT/US2022/052249 dated Apr. 17, 2023, 12 pages.

International Search Report and Written Opinion issued in International Patent application PCT/US2022/052233 dated Apr. 17, 2023, 9 pages.

International Search Report and Written Opinion issued in International Patent application PCT/US2022/052257 dated Apr. 17, 2023, 13 pages.

Office Action issued in U.S. Appl. No. 17/643,703 dated Jun. 23, 2023, 9 pages.

Office Action issued in U.S. Appl. No. 17/643,701 dated Oct. 11, 2023, 14 pages.

* cited by examiner

COMPOSITIONS AND METHODS FOR WELL CEMENTING

BACKGROUND

The statements in this section merely provide background information related to the present disclosure and may not constitute prior art.

The present disclosure broadly relates to well cementing. More particularly the invention relates to compositions that contain materials that expand upon hydration, thereby improving zonal isolation in a subterranean well.

Good bonding between set cement and casing, and between the set cement and the formation, is essential for effective zonal isolation. Poor bonding limits production, and reduces the effectiveness of stimulation treatments. Communication between zones can be caused by inadequate drilling fluid removal, poor cement/formation bonding, expansion and contraction of the casing resulting from internal pressure or thermal stress, and cement contamination by drilling or formation fluids. Under such circumstances, a small gap or "microannulus" may develop at the cement/casing or the cement/formation interface.

Cement systems that expand slightly after setting are a proven means of sealing microannuli and improving primary cementing results. The improved bonding is the result of mechanical resistance or tightening of the cement against the pipe and formation. Portland cement manufacturers limit the amount of certain alkaline impurities to avoid expansion of the set cement, a condition called "unsoundness." In an unrestrained environment such as a road or building, expansion of the set cement can result in cracking and failure. In a wellbore environment, however, the cement is restrained by the casing and, when competent, the formation; consequently, once the cement has expanded to eliminate void spaces, further expansion reduces internal cement porosity.

Most expansive well cement systems rely upon the formation of the mineral ettringite, after the cement has set. Ettringite crystals have a greater bulk volume than the components from which they form; consequently, expansion occurs because of the internal pressure exerted upon crystallization. Today the most common method for preparing ettringite-base expansive cements is to add calcium sulfate hemihydrate ($CaSO_4 \cdot \frac{1}{2} H_2O$) to a portland cement that contains at least 5 wt % tricalcium aluminate (abbreviated as $C_3A$). A limitation of ettringite-base systems is their inability to provide significant expansion at curing temperatures above about 170° F. (76° C.). Ettringite is not stable at higher temperatures, and converts to a more dense calcium sulfoaluminate hydrate and gypsum.

Cement slurries containing high concentrations of NaCl, $Na_2SO_4$ or both were among the earliest expansive well cements. After setting, cement expansion occurs because of internal pressure exerted by the crystallization of the salts within pores, and by chlorosilicate reactions. These systems are effective at temperatures up to about 400° F. (204° C.).

Calcium oxide and magnesium oxide provide an expansive force within the cement matrix resulting from hydration to their respective hydroxides. The hydrated material occupies more space than that of the original ingredients. CaO may be more effective than MgO at curing temperatures below about 60° C. (140° F.). For well cementing operations, MgO may be calcined at temperatures between about 700° C. and 2000° C., or between 1100° C. and 1300° C. Such calcination may delay the expansion reaction until after the cement slurry sets. In some cases, blends of CaO and calcined MgO may be employed to provide effective expansion throughout a wider curing temperature range.

A thorough discussion concerning expanding cement systems may be found in the following publication. Nelson EB et al.: "Special Cement Systems," in Nelson EB and Guillot D (eds.): *Well Cementing—2$^{nd}$ Edition*, Schlumberger (2006) 235-237.

During a well cementing operation, the cement slurry may contact a spacer fluid or a drilling fluid. During displacement in the well, operators endeavor to minimize commingling of the cement slurry with other fluids; however, should such commingling take place, dilution of the cement slurry may occur, possibly resulting in suboptimal zonal isolation.

SUMMARY

Applicant has determined that including one or more expanding agents in a spacer fluid, drilling fluid or both may minimize the deleterious effects arising from commingling with the cement slurry, thereby preserving cement slurry expansion and promoting zonal isolation.

In an aspect, embodiments relate to compositions comprising water, a viscosifying agent and an expanding agent comprising calcium oxide or calcined magnesium oxide or both.

In a further aspect, embodiments relate to methods comprising preparing a spacer fluid the comprises water, a viscosifying agent and an expanding agent comprising calcium oxide, calcined magnesium oxide or both. During a well cementing operation, the spacer fluid is placed in the well such that the spacer fluid flows between a drilling fluid and a cement slurry. The spacer fluid commingles with the drilling fluid or the cement slurry, thereby forming an interface. The cement slurry and the interface are cured, wherein the interface expands or does not shrink upon the curing.

In a further aspect, embodiments relate to compositions comprising a non-aqueous liquid and an expanding agent comprising calcium oxide or calcined magnesium oxide or both.

In a further aspect, embodiments relate to methods comprising preparing a drilling fluid comprising a non-aqueous fluid and an expanding agent comprising calcium oxide or calcined magnesium oxide or both. During a well cementing operation, the drilling fluid is placed in the well such that the drilling fluid flows ahead of a cement slurry. The drilling fluid commingles with the cement slurry, thereby forming an interface. The cement slurry and the interface are cured, wherein the interface expands or does not shrink upon the curing.

In a further aspect, embodiments relate to compositions comprising an aqueous cement slurry and a non-aqueous additive comprising a suspension of an expanding agent comprising calcium oxide or a mixture of calcium oxide and calcined magnesium oxide.

In a further aspect, embodiments relate to methods comprising preparing a composition comprising an aqueous cement slurry and a non-aqueous additive comprising a suspension of an expanding agent comprising calcium oxide and calcined magnesium oxide or both. During a well cementing operation, the cement slurry is placed in the well such that the cement slurry flows behind a spacer fluid or a drilling fluid or both. The spacer fluid or the drilling fluid may commingle with the cement slurry, thereby forming an interface. The cement slurry and the interface are cured, wherein the interface expands or does not shrink upon the curing.

DETAILED DESCRIPTION

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation—specific decisions are made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary of the disclosure and this detailed description, each numerical value should be read once as modified by the term "about" (unless already expressly so modified), and then read again as not so modified unless otherwise indicated in context. The term about should be understood as any amount or range within 10% of the recited amount or range (for example, a range from about 1 to about 10 encompasses a range from 0.9 to 11). Also, in the summary and this detailed description, it should be understood that a concentration range listed or described as being useful, suitable, or the like, is intended that any concentration within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, even if specific data points within the range, or even no data points within the range, are explicitly identified or refer to a few specific, it is to be understood that inventors appreciate and understand that any data points within the range are to be considered to have been specified, and that inventors possessed knowledge of the entire range and the points within the range.

Spacer Fluids Containing Expanding Agents

In an aspect, embodiments relate to compositions comprising water, a viscosifying agent and an expanding agent comprising calcium oxide or calcined magnesium oxide or both. Such compositions may be spacer fluids.

In a further aspect, embodiments relate to methods comprising preparing a spacer fluid the comprises water, a viscosifying agent and an expanding agent comprising calcium oxide, calcined magnesium oxide or both. During a well cementing operation, the spacer fluid is placed in the well such that the spacer fluid flows between a drilling fluid and a cement slurry. The spacer fluid commingles with the drilling fluid or the cement slurry, thereby forming an interface. The cement slurry and the interface are cured, wherein the interface expands or does not shrink upon the curing.

The cement slurry may comprise portland cement, pozzolan cement, gypsum cement, high alumina cement, slag cement, lime-silica blends or geopolymer cements or combinations thereof.

The volume ratio between the cement slurry and the spacer fluid in the commingled cement slurry and spacer fluid may be between 99:1 and 1:99.

For both aspects, the MgO may be calcined at temperatures between about 700° C. and 2000° C., or between 1100° C. and 1300° C.

For both aspects, the viscosifying agent may comprise an organophilic clay, hydrophobically modified silica, hydrophobically modified biopolymers or hydrophobically modified synthetic polymers or combinations thereof. The hydrophobically modified biopolymer may comprise acetone-formaldehyde-sodium bisulfate polymer and D-Glucopyranuronic acid, polymer with 6-deoxy-L-mannose, D-glucose and D-mannose, calcium potassium sodium salt. The weight ratio between the acetone-formaldehyde-sodium bisulfate polymer and the D-Glucopyranuronic acid, polymer with 6-deoxy-L-mannose, D-glucose and D-mannose, calcium potassium sodium salt may be between 80:20 and 20:80, or between 66.7:33.3 and 33.3:66.7.

For both aspects, the viscosifying agent may further comprise bentonite, present at a concentration in the viscosifying agent between 0.1 wt % and 10 wt %, or between 0.5 wt % and 5.0 wt %.

For both aspects, the viscosifying agent may be present in the composition at a concentration between 0.1 wt % and 10 wt %, or between 0.5% and 5.0 wt %.

For both aspects, the expanding agent may be present in the composition at a concentration between 0.1 wt % and 20 wt %, or between 0.5 wt % and 10 wt %. The expanding agent may be a blend of calcium oxide and calcined magnesium oxide. The weight ratio between the calcium oxide and the calcined magnesium oxide may vary between 10:90 and 90:10, or between 60:40 and 40:60.

For both aspects, the expanding agent may be suspended in a non-aqueous additive comprising a hydrocarbon liquid, and the expanding agent may be present in the non-aqueous additive at a concentration between 10 wt % and 80 wt %, or between 30 wt % and 60 wt %. The hydrocarbon liquid may comprise alkanes, alkenes, alkynes, cycloalkanes, aromatic hydrocarbons, natural gas liquids, liquid paraffins, naphthas, mineral oils, crude oils, synthesized hydrocarbon liquids, fuel oils, diesels, gasolines, biomass derived hydrocarbon liquids, coal derived hydrocarbon liquids, or kerosine, or mixtures thereof. The hydrocarbon liquid may be Escaid™ 110, available from ExxonMobil.

For both aspects, the non-aqueous additive may further comprise a dispersant comprising polynaphthalene sulfonate, sulfonated acetone formaldehyde condensate, polycarboxylate ethers or microparticles or combinations thereof. The dispersant may be present in the non-aqueous additive at a concentration between 0.1 wt % and 20 wt %, or between 2.0 wt % and 10 wt %.

For both aspects, the non-aqueous additive may further comprise an emulsifier comprising polysorbates or sorbitan esters, or both. The emulsifier may be present at a concentration between 0.01 wt % and 10 wt %, or 1 wt % to 5 wt %.

For both aspects, the expanding agent may be encapsulated by a coating having a thickness between about 2 μm and 80 μm. The coating may comprise a polymer comprising a polyester, a polyacrylate, an epoxy, a polyhydroxyacid, a polypeptide, a polyesteramide, a polysulfide, a polysiloxane, a block copolymer comprising blocks joined through ester bonds, or a block copolymer comprising blocks joined through amide bonds, or combinations thereof. Or, the coating may comprise silica that is sprayed onto the encapsulating agent as a silicate solution.

For both aspects, the compositions may further comprise a weighting agent comprising silica, barite, hematite, calcium carbonate, ilmenite or manganese tetraoxide or combinations thereof. The density of the composition may therefore vary between about 10 lbm/gal (1200 kg/m$^3$) and about 24 lbm/gal (2880 kg/m$^3$). To achieve lower densities, for example as low as 8 lbm/gal (960 kg/m$^3$), the composition may further comprise low-density additives including ceramic microspheres, glass microspheres or plastic beads or combinations thereof. Or, the compositions may be foamed with air or nitrogen.

Non-Aqueous Drilling Fluids Containing Expanding Agents

In a further aspect, embodiments relate to compositions comprising a non-aqueous liquid and an expanding agent comprising calcium oxide or calcined magnesium oxide or both. The compositions may be drilling fluids.

In a further aspect, embodiments relate to methods comprising preparing a drilling fluid comprising a non-aqueous fluid and an expanding agent comprising calcium oxide or calcined magnesium oxide or both. During a well cementing operation, the drilling fluid is placed in the well such that the drilling fluid flows ahead of a cement slurry. The drilling fluid commingles with the cement slurry, thereby forming an interface. The cement slurry and the interface are cured, wherein the interface expands or does not shrink upon the curing.

A spacer fluid may be placed between the drilling fluid and the cement slurry.

The cement slurry may comprise portland cement, pozzolan cement, gypsum cement, high alumina cement, slag cement, lime-silica blends or geopolymer cements or combinations thereof.

The volume ratio between the cement slurry and the drilling fluid in the commingled cement slurry and spacer fluid may be between 99:1 and 1:99.

For both aspects, the non-aqueous fluid may comprise one liquid phase or a water-in-oil emulsion wherein the oil is the external phase.

For both aspects, the MgO may be calcined at temperatures between about 700° C. and 2000° C., or between 1100° C. and 1300° C.

For both aspects, the expanding agent may be present in the composition at a concentration between 0.1 wt % and 20 wt %, or between 0.5 wt % and 10 wt %.

For both aspects, the expanding agent may be encapsulated by a coating having a thickness between about 2 μm and 80 μm. The coating may comprise a polymer comprising a polyester, a polyacrylate, an epoxy, a polyhydroxyacid, a polypeptide, a polyesteramide, a polysulfide, a polysiloxane, a block copolymer comprising blocks joined through ester bonds, or a block copolymer comprising blocks joined through amide bonds, or combinations thereof. Or, the coating may comprise silica that is sprayed onto the encapsulating agent as a silicate solution.

For both aspects, the expanding agent may be suspended in a non-aqueous additive comprising a hydrocarbon liquid, and the expanding agent may be present in the non-aqueous additive at a concentration between 10 wt % and 80 wt %, or between 30 wt % and 60 wt %. The hydrocarbon liquid may comprise alkanes, alkenes, alkynes, cycloalkanes, aromatic hydrocarbons, natural gas liquids, liquid paraffins, naphthas, mineral oils, crude oils, synthesized hydrocarbon liquids, fuel oils, diesels, gasolines, biomass derived hydrocarbon liquids, coal derived hydrocarbon liquids, or kerosine, or mixtures thereof. The hydrocarbon liquid may be Escaid™ 110, available from ExxonMobil.

For both aspects, the non-aqueous additive may further comprise a dispersant comprising polynaphthalene sulfonate, sulfonated acetone formaldehyde condensate, polycarboxylate ethers or microparticles or combinations thereof. The dispersant may be present in the non-aqueous additive at a concentration between 0.1 wt % and 20 wt %, or between 2.0 wt % and 10 wt %.

For both aspects, the non-aqueous additive may further comprise an emulsifier comprising polysorbates or sorbitan esters, or both. The emulsifier may be present at a concentration between 0.01 wt % and 10 wt %, or between 1 wt % and 5 wt %.

For both aspects, the composition may further comprise a weighting agent comprising silica, barite, hematite, calcium carbonate, ilmenite or manganese tetraoxide or combinations thereof. The density of the composition may therefore vary between about 10 lbm/gal (1200 kg/m$^3$) and about 24 lbm/gal (2880 kg/m$^3$). To achieve lower densities, for example as low as 8 lbm/gal (960 kg/m$^3$), the composition may further comprise low-density additives including ceramic microspheres, glass microspheres or plastic beads or combinations thereof. Or, the compositions may be foamed with air or nitrogen.

For both aspects, the viscosifying agent may comprise an organophilic clay, hydrophobically modified silica, hydrophobically modified biopolymers or hydrophobically modified synthetic polymers or combinations thereof. The hydrophobically modified biopolymer may comprise acetone-formaldehyde-sodium bisulfate polymer and D-Glucopyranuronic acid, polymer with 6-deoxy-L-mannose, D-glucose and D-mannose, calcium potassium sodium salt. The weight ratio between the acetone-formaldehyde-sodium bisulfate polymer and the D-Glucopyranuronic acid, polymer with 6-deoxy-L-mannose, D-glucose and D-mannose, calcium potassium sodium salt may be between 80:20 and 20:80, or between 66.7:33.3 and 33.3:66.7.

For both aspects, the viscosifying agent may further comprise bentonite, present at a concentration in the viscosifying agent between 0.1 wt % and 10 wt %, or between 0.5 wt % and 5.0 wt %.

Cement Slurries

In a further aspect, embodiments relate to compositions comprising an aqueous cement slurry and a non-aqueous additive comprising a suspension of an expanding agent comprising calcium oxide or a mixture of calcium oxide and calcined magnesium oxide.

In a further aspect, embodiments relate to methods comprising preparing a composition comprising an aqueous cement slurry and a non-aqueous additive comprising a suspension of an expanding agent comprising calcium oxide and calcined magnesium oxide or both. During a well cementing operation, the cement slurry is placed in the well such that the cement slurry flows behind a spacer fluid or a drilling fluid or both. The spacer fluid or the drilling fluid may commingle with the cement slurry, thereby forming an interface. The cement slurry and the interface are cured, wherein the interface expands or does not shrink upon the curing.

The aqueous cement slurry may comprise water, portland cement, pozzolan cement, gypsum cement, high alumina cement, slag cement, lime-silica blends or geopolymer cements or combinations thereof.

The volume ratio between the cement slurry and the drilling fluid in the commingled cement slurry and spacer fluid, or between the cement slurry and the spacer fluid in the commingled cement slurry and spacer fluid, may be between 99:1 and 1:99.

For both aspects, the non-aqueous additive may comprise a hydrocarbon liquid. The hydrocarbon liquid may comprise alkanes, alkenes, alkynes, cycloalkanes, aromatic hydrocarbons, natural gas liquids, liquid paraffins, naphthas, mineral oils, crude oils, synthesized hydrocarbon liquids, fuel oils, diesels, gasolines, biomass derived hydrocarbon liquids, coal derived hydrocarbon liquids, or kerosine, or mixtures thereof. The hydrocarbon liquid may be Escaid™ 110, available from ExxonMobil. The hydrocarbon liquid may be present in the non-aqueous additive at a concentration between 1 wt % and 99 wt %, or between 30 wt % and 70 wt %.

For both aspects, the MgO may be calcined at temperatures between about 700° C. and 2000° C., or between 1100° C. and 1300° C.

For both aspects, the expanding agent may be present in the non-aqueous additive at a concentration between 0.1 wt % and 20 wt %, or between 0.5 wt % and 10 wt %.

For both aspects, the non-aqueous additive may further comprise a dispersant comprising polynaphthalene sulfonate, sulfonated acetone formaldehyde condensate, polycarboxylate ethers or microparticles or combinations thereof. The dispersant may be present in the non-aqueous additive at a concentration between 0.1 wt % and 20 wt %, or between 2.0 wt % and 10 wt %.

For both aspects, the non-aqueous additive may further comprise an emulsifier comprising polysorbates or sorbitan esters, or both. The emulsifier may be present at a concentration between 0.01 wt % and 10 wt %, or between 1 wt % and 5 wt %.

For both aspects, the composition may further comprise a weighting agent comprising silica, barite, hematite, calcium carbonate, ilmenite or manganese tetraoxide or combinations thereof. The density of the composition may therefore vary between about 10 lbm/gal (1200 kg/m$^3$) and about 24 lbm/gal (2880 kg/m$^3$). To achieve lower densities, for example as low as 8 lbm/gal (960 kg/m$^3$), the composition may further comprise low-density additives including ceramic microspheres, glass microspheres or plastic beads or combinations thereof. Or, the compositions may be foamed with air or nitrogen.

EXAMPLES

The following examples are presented to provide a general illustration of the present disclosure, and are not intended to limit the scope of the disclosure in any way.

The following examples describe expansion experiments that were performed using five fluid formulations, described below.

Formulation 1 was a 15.8 lbm/gal (1900 kg/m$^3$) Class G cement slurry, with 0.1 gal/94-lb sack (0.88 L/tonne of cement) silicone antifoam agent and 0.28 gal/sk (24.86 L/tonne of cement) liquid expansion additive. The liquid expansion additive had a 50:50 solid:liquid ratio. The solid portion was CaO and calcined MgO in a 60:40 weight ratio. The liquid phase was 97% Escaid™ 110 oil and 3% viscosifying polymer. The viscosifying polymer was poly(propylene-alt-ethylene) multi-arm, available from Kraton Corporation, Houston, Tex., USA.

Formulation 2 was a 14.0-lbm/gal (1680 kg/m$^3$) aqueous spacer fluid containing an expansion additive. The fluid contained 0.1 gal/bbl silicone antifoam, 4 lbm/bbl bentonite, 4 lbm/bbl of a viscosifier comprising 66.7% acetone-formaldehyde-sodium bisulfate polymer and 33.3% D-Glucopyranuronic acid, polymer with 6-deoxy-L-mannose, D-glucose and D-mannose, calcium potassium sodium salt, 5.3 gal/bbl liquid expansion additive (as described in Formulation 1) and 6.8 lbm/bbl barite weighting agent.

Formulation 3 was a 14.0-lbm/gal (1680 kg/m$^3$) aqueous spacer fluid without an expansion additive. The fluid contained 0.1 gal/bbl silicone antifoam, 4 lbm/bbl bentonite, 4 lbm/bbl of a viscosifier comprising 66.7% acetone-formaldehyde-sodium bisulfate polymer and 33.3% D-Glucopyranuronic acid, polymer with 6-deoxy-L-mannose, D-glucose and D-mannose, calcium potassium sodium salt and 6.8 lbm/bbl barite weighting agent.

Formulation 4 was a 10.8 lbm/gal (1300 kg/m$^3$) oil-base drilling fluid containing an expansion additive. The fluid composition is given in Table 1 below.

TABLE 1

Formulation 4 composition.

| | | Concentration | |
|---|---|---|---|
| # | Products | Field, lbm per bbl of prepared fluid | Lab, g for 350 ml prepared fluid |
| 1 | MG-3 base oil, available from Petronas | 165.21 | 165.21 |
| 2 | Calcium chloride | 24.73 | 24.73 |
| 3 | VG SUPREME organophilic clay viscosifier, available from Schlumberger | 6.00 | 6.00 |
| 4 | Calcium hydroxide | 5.00 | 5.00 |
| 5 | VERSATROL M asphaltic resin, available from Schlumberger | 5.00 | 5.00 |
| 6 | Calcium carbonate | 10.00 | 10.00 |

TABLE 1-continued

Formulation 4 composition.

| # | Products | Concentration Field, lbm per bbl of prepared fluid | Concentration Lab, g for 350 ml prepared fluid |
|---|---|---|---|
| 7 | VERSAMOD gelling agent, available from Schlumberger | 1.00 | 1.00 |
| 8 | SUREMUL PLUS emulsifier, available from Schlumberger | 6.00 | 6.00 |
| 9 | Water | 82.07 | 82.07 |
| 10 | Barite | 148.58 | 148.58 |
| 11 | 60:40 blend of CaO and calcined MgO | 29.86 | 29.86 |

Formulation 5 was a 10.8 Ibm/gal (1300 kg/m$^3$) oil-base drilling fluid without an expansion additive. The fluid composition is given in Table 2 below.

TABLE 2

Formulation 5 composition.

| # | Products | Concentration Field, lbm per bbl of prepared fluid | Concentration Lab, g for 350 ml prepared fluid |
|---|---|---|---|
| 1 | MG-3 base oil, available from Petronas | 165.21 | 165.21 |
| 2 | Calcium chloride | 24.73 | 24.73 |
| 3 | VG SUPREME organophilic clay viscosifier, available from Schlumberger | 6.00 | 6.00 |
| 4 | Calcium hydroxide | 5.00 | 5.00 |
| 5 | VERSATROL M asphaltic resin, available from Schlumberger | 5.00 | 5.00 |
| 6 | Calcium carbonate | 10.00 | 10.00 |
| 7 | VERSAMOD gelling agent, available from Schlumberger | 1.00 | 1.00 |
| 8 | SUREMUL PLUS emulsifier, available from Schlumberger | 6.00 | 6.00 |
| 9 | Water | 82.07 | 82.07 |
| 10 | Barite | 148.58 | 148.58 |

Figure 1:
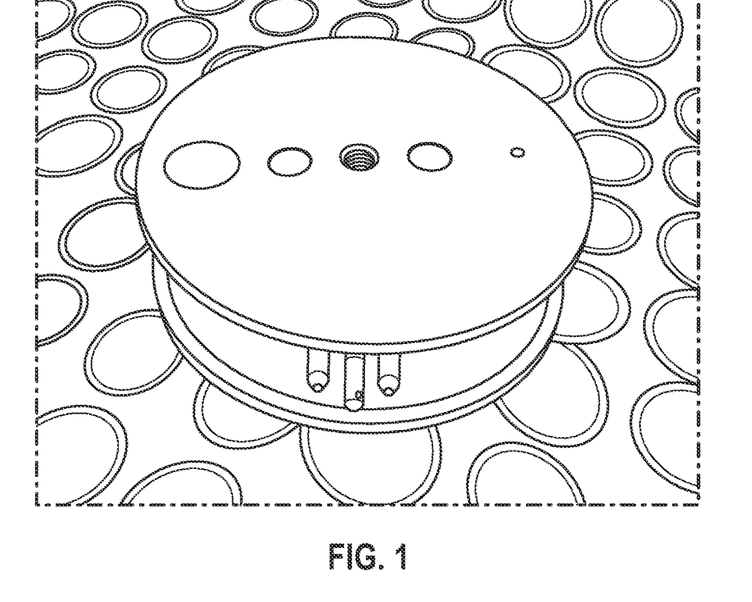
FIG. 1 is a photograph of a linear expansion cell.

Linear expansion tests were performed with the above formulations. The fluids were prepared and mixed in a 200-mL beaker of either pure fluid or with fluid blends to simulate commingling in a wellbore during placement. The test fluids were placed within an expansion cell (FIG. 1) and then lowered into a water bath. Expansion measurements were taken periodically during curing in the water bath. Additional information concerning the expansion test method may be found in the following publication. Dargaud B and Boukhelifa L: "Laboratory Testing, Evaluation and Analysis of Well Cements," in Nelson EB and Guillot D (eds.): *Well Cementing—2$^{nd}$ Edition*, Schlumberger (2006) 641-643.

Example 1

Figure 2:
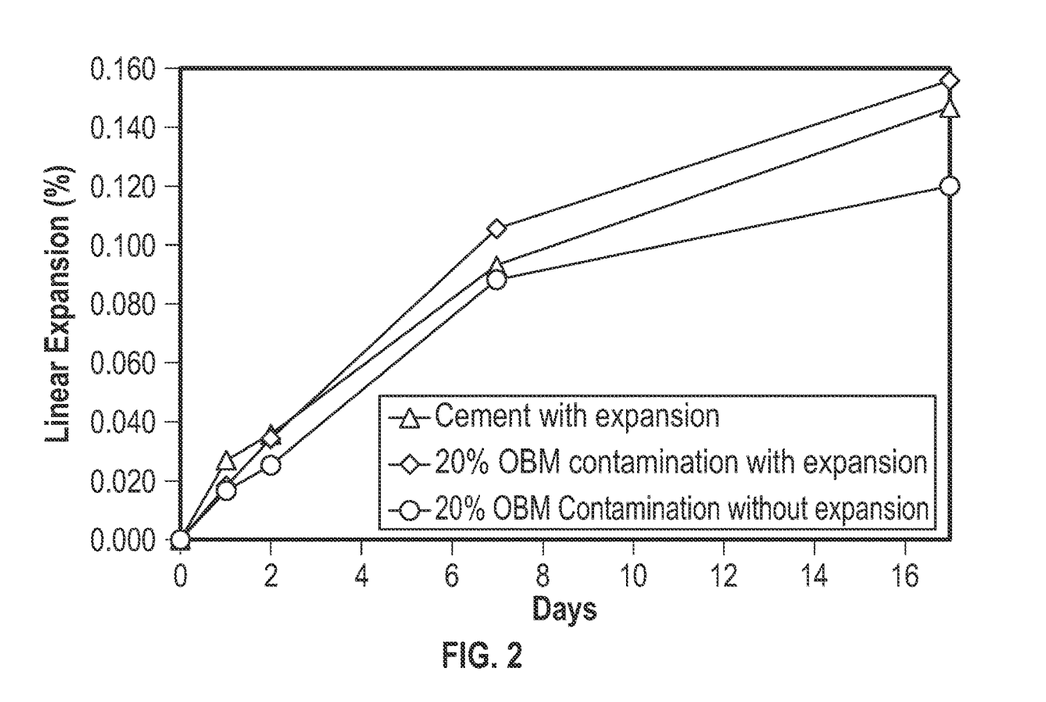
FIG. 2 presents linear expansion data from expansive cement slurries contaminated by an oil-base drilling fluid, with and without an expansion agent in the drilling fluid.

Testing was conducted to determine the effects of commingling between a cement slurry containing an expanding agent and oil-base drilling fluids with and without an expanding agent. Three fluids were tested: a control system of Formulation 1 alone; an 80:20 volume ratio of Formulation 1 and Formulation 4; and an 80:20 volume ratio of Formulation 1 and Formulation 5. The curing temperature was 54° C. The results, shown in FIG. 2, reveal that the best performing system was the one in which the cement slurry was contaminated with the oil-base drilling fluid containing the expansion agent. Next, was Formulation 1 alone. The smallest expansion was observed when the oil-base drilling fluid did not also contain the expansion agent. Thus, commingling of the cement slurry with oil-base drilling fluid containing expansion agent leads to better expansion and bonding between the set cement and the casing and formation surfaces, leading to better zonal isolation.

Example 2

Figure 3:
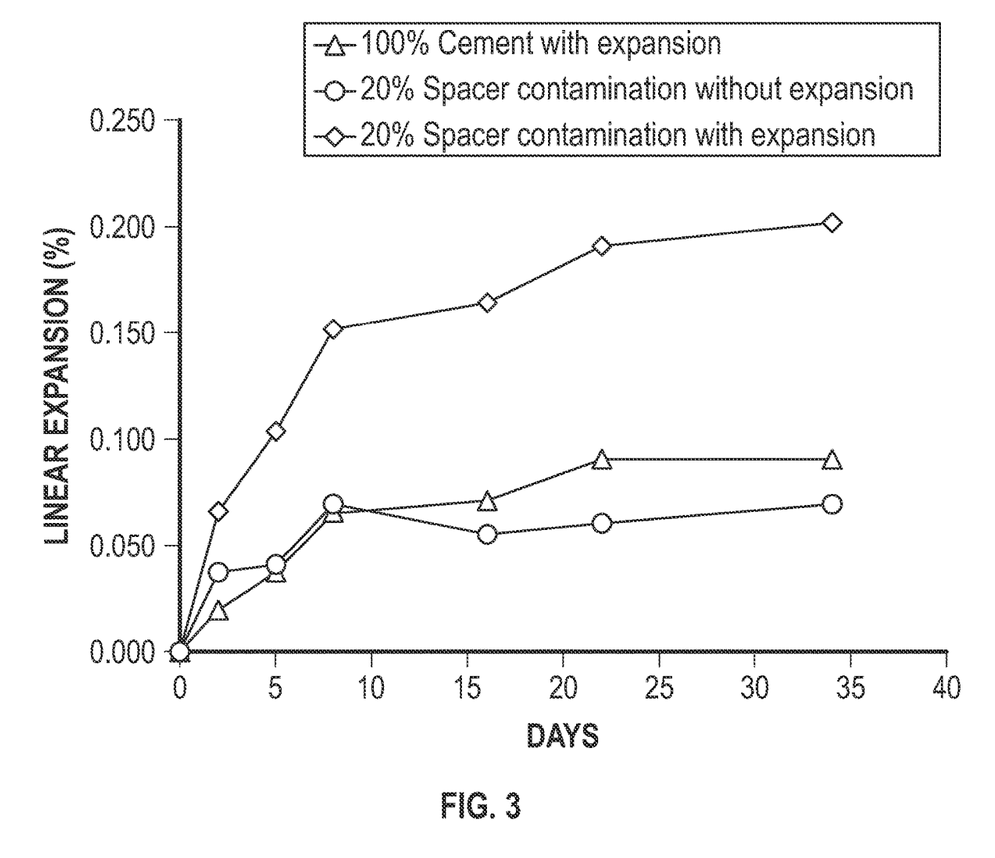
FIG. 3 presents linear expansion data from expansive cement slurries contaminated by an aqueous spacer fluid, with and without an expansion agent in the spacer fluid.

Testing was conducted to determine the effects of commingling between a cement slurry containing an expanding agent and aqueous spacer fluids with and without an expanding agent. Three fluids were tested: a control system of Formulation 1 alone; an 80:20 volume ratio of Formulation 1 and Formulation 2; and an 80:20 volume ratio of Formulation 1 and Formulation 3. The curing temperature was 54° C. The results, shown in FIG. 3, reveal that the best performing system was the one in which the cement slurry was contaminated with the spacer fluid containing the expansion agent. This was followed by Formulation 1 alone. The smallest expansion was observed when the spacer fluid did not also contain the expansion agent. Thus, commingling of the cement slurry with spacer fluid containing expansion agent leads to better expansion and bonding between the set cement and the casing and formation surfaces, leading to better zonal isolation.

The preceding description has been presented with reference to present embodiments. Persons skilled in the art and technology to which this disclosure pertains will appreciate that alterations and changes in the described structures and methods of operation can be practiced without meaningfully departing from the principle, and scope of this present disclosure. Accordingly, the foregoing description should not be read as pertaining only to the precise structures described and shown in the accompanying drawings, but rather should be read as consistent with and as support for the following claims, which are to have their fullest and fairest scope.

What is claimed is:

1. A method, comprising:
   (a) preparing a spacer fluid comprising: water, a viscosifying agent, and an expanding agent comprising calcium oxide or calcined magnesium oxide or both;
   (b) during a well cementing operation, placing a drilling fluid, the spacer fluid, and a cement slurry into a well such that the spacer fluid flows between the drilling fluid and the cement slurry;
   (c) causing the spacer fluid to commingle with the drilling fluid or the cement slurry, or both, thereby forming an interface; and
   (d) curing the cement slurry and the interface, wherein the interface expands or does not shrink upon the curing, wherein the expanding agent is present in the spacer fluid at a concentration between 0.1 wt% and 20 wt%, wherein the expanding agent is suspended in a non-aqueous additive comprising a hydrocarbon liquid, and the expanding agent is present in the non-aqueous additive at a concentration between 10 wt% and 80 wt%.

2. The method of claim 1, wherein the calcined magnesium oxide is calcined at a temperature between 700° C. and 2000° C.

3. The method of claim 1, wherein:
   the viscosifying agent comprises an organophilic clay, hydrophobically modified silica, hydrophobically modified biopolymers or hydrophobically modified synthetic polymers or combinations thereof; and
   the hydrophobically modified biopolymer comprises:
      acetone-formaldehyde-sodium bisulfate polymer; and
      D-Glucopyranuronic acid, polymer with 6-deoxy-L-mannose, D-glucose and D- mannose, calcium potassium sodium salt.

4. The method of claim 1, wherein:
   the viscosifying agent further comprises bentonite, present at a concentration in the viscosifying agent between 0.1 wt% and 10 wt%; and
   the viscosifying agent is present in the spacer fluid at a concentration between 0.1 wt% and 10 wt%.

5. The method of claim 1, wherein the hydrocarbon liquid comprises alkanes, alkenes, alkynes, cycloalkanes, aromatic hydrocarbons, natural gas liquids, liquid paraffins, naphthas, mineral oils, crude oils, synthesized hydrocarbon liquids, fuel oils, diesels, gasolines, biomass derived hydrocarbon liquids, coal derived hydrocarbon liquids, or kerosene, or mixtures thereof.

6. The method of claim 1, wherein:
   the non-aqueous additive further comprises a dispersant comprising polynaphthalene sulfonate, sulfonated acetone formaldehyde condensate, polycarboxylate ethers, or micro particles or combinations thereof; and
   the dispersant is present in the non-aqueous additive at a concentration between 0.1 wt% to 20 wt%.

7. The method of claim 1, wherein:
   the non-aqueous additive further comprises an emulsifier comprising polysorbates or sorbitan esters, or both; and
   the emulsifier is present in the non-aqueous additive at a concentration between 0.01 wt% and 10 wt%.

8. The method of claim 1, wherein:
   the expanding agent is encapsulated by a coating having a thickness between about 2 mm and 80 mm; and
   the coating comprises a polymer comprising a polyester, a polyacrylate, an epoxy, a polyhydroxyacid, a polypeptide, a polyesteramide, a polysulfide, a polysiloxane, a block copolymer comprising blocks joined through ester bonds, or a block copolymer comprising blocks joined through amide bonds, or a combination thereof, or silica.

9. The method of claim 1, wherein the spacer fluid further comprises a weighting agent, the weighting agent comprising silica, barite, hematite, ilmenite or manganese tetraoxide or combinations thereof.

10. The method of claim 1, wherein the cement slurry comprises portland cement, pozzolan cement, gypsum cement, high alumina cement, slag cement, lime-silica blends or geopolymer cements or combinations thereof.

11. The method of claim 1, wherein a volume ratio between the cement slurry and the spacer fluid in the commingled cement slurry and spacer fluid is between 99:1 and 1:99.

12. The method of claim 1, wherein the drilling fluid is an aqueous fluid, a non- aqueous fluid, a water-in-oil emulsion or an oil-in-water emulsion.

13. A method, comprising:
   (a) preparing a spacer fluid comprising: water, a viscosifying agent, and an expanding agent comprising calcium oxide or calcined magnesium oxide or both;
   (b) during a well cementing operation, placing a drilling fluid, the spacer fluid, and a cement slurry into a well such that the spacer fluid flows between the drilling fluid and the cement slurry;
   (c) causing the spacer fluid to commingle with the drilling fluid or the cement slurry, or both, thereby forming an interface; and
   (d) curing the cement slurry and the interface, wherein the interface expands or does not shrink upon the curing, wherein the expanding agent is encapsulated by a coating having a thickness between about 2 mm and 80 mm, and
   wherein the coating comprises a polymer comprising a polyester, a polyacrylate, an epoxy, a polyhydroxyacid, a polypeptide, a polyesteramide, a polysulfide, a polysiloxane, a block copolymer comprising blocks joined through ester bonds, or a block copolymer comprising blocks joined through amide bonds, or a combination thereof, or silica.

14. The method of claim 13, wherein the calcined magnesium oxide is calcined at a temperature between 700° C. and 2000° C.

15. The method of claim 13, wherein:
   the viscosifying agent comprises an organophilic clay, hydrophobically modified silica, hydrophobically modified biopolymers or hydrophobically modified synthetic polymers or combinations thereof; and
   the hydrophobically modified biopolymer comprises:
      acetone-formaldehyde-sodium bisulfate polymer; and
      D-Glucopyranuronic acid, polymer with 6-deoxy-L-mannose, D-glucose and D-mannose, calcium potassium sodium salt.

16. The method of claim 13, wherein:
   the viscosifying agent further comprises bentonite, present at a concentration in the viscosifying agent between 0.1 wt% and 10 wt%; and
   the viscosifying agent is present in the spacer fluid at a concentration between 0.1 wt% and 10 wt%.

17. The method of claim 13, wherein the spacer fluid further comprises a weighting agent, the weighting agent comprising silica, barite, hematite, ilmenite or manganese tetraoxide or combinations thereof.

18. The method of claim 13, wherein the cement slurry comprises portland cement, pozzolan cement, gypsum cement, high alumina cement, slag cement, lime-silica blends or geopolymer cements or combinations thereof.

19. The method of claim 13, wherein a volume ratio between the cement slurry and the spacer fluid in the commingled cement slurry and spacer fluid is between 99:1 and 1:99.

20. The method of claim 13, wherein the drilling fluid is an aqueous fluid, a non-aqueous fluid, a water-in-oil emulsion or an oil-in-water emulsion.

\* \* \* \* \*